United States Patent
Liang et al.

(10) Patent No.: US 11,256,925 B2
(45) Date of Patent: Feb. 22, 2022

(54) MONITORING SYSTEM AND MONITORING METHOD THEREOF

(71) Applicant: Wistron Corporation, New Taipei (TW)

(72) Inventors: Chen-Yi Liang, New Taipei (TW); Kun-Ting Xie, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/459,560

(22) Filed: Jul. 1, 2019

(65) Prior Publication Data
US 2020/0293788 A1 Sep. 17, 2020

(30) Foreign Application Priority Data
Mar. 12, 2019 (TW) ................. 108108135

(51) Int. Cl.
*H04N 5/00* (2011.01)
*G06K 9/00* (2022.01)
(Continued)

(52) U.S. Cl.
CPC ..... *G06K 9/00771* (2013.01); *G06K 9/00335* (2013.01); *G06T 7/20* (2013.01);
(Continued)

(58) Field of Classification Search
CPC .. G06K 9/00771; G06K 9/00335; G06T 7/50; G06T 7/70; G06T 7/20;
(Continued)

(56) References Cited

U.S. PATENT DOCUMENTS 5,446,445 A * 8/1995 Bloomfield ............ G08B 17/10
340/521
10,163,162 B1 * 12/2018 Devereaux ............ G06Q 50/16
(Continued)

FOREIGN PATENT DOCUMENTS

CN 1049994 3/2000
CN 101977302 2/2011
(Continued)

OTHER PUBLICATIONS

"Office Action of Taiwan Counterpart Application," dated Feb. 10, 2020, p. 1-p. 19.

(Continued)

*Primary Examiner* — Zhihan Zhou
(74) *Attorney, Agent, or Firm* — JCIPRNET

(57) ABSTRACT

A monitoring system and a monitoring method thereof are provided. The monitoring system includes a thermal imaging device and a processor. The thermal imaging device obtains a thermal imaging image. The processor is coupled to the thermal imaging device. The processor determines a separating distance between a reference thermal source and a target thermal source in the thermal imaging image. The reference thermal source corresponds to a reference position, and the target thermal source corresponds to a target person. The processor determines a current posture corresponding to the target thermal source in the thermal imaging image. The processor transmits an alarm signal according to the separating distance and the current posture. Accordingly, the misgivings for the privacy violation may be ceased, and it is adapted for low light environment.

18 Claims, 8 Drawing Sheets

(51) Int. Cl.
- *G08B 21/02* (2006.01)
- *H04N 5/225* (2006.01)
- *G06T 7/70* (2017.01)
- *G06T 7/20* (2017.01)
- *H04N 5/232* (2006.01)
- *G06T 7/50* (2017.01)

(52) U.S. Cl.
CPC .............. *G06T 7/50* (2017.01); *G06T 7/70* (2017.01); *G08B 21/02* (2013.01); *H04N 5/2253* (2013.01); *H04N 5/23299* (2018.08); *G06T 2207/10048* (2013.01); *G06T 2207/30196* (2013.01); *G06T 2207/30232* (2013.01)

(58) Field of Classification Search
CPC . G06T 2207/10048; G06T 2207/30196; G06T 2207/30232; H04N 5/23299; H04N 5/2253; G08B 21/02
See application file for complete search history.

(56) References Cited

U.S. PATENT DOCUMENTS

| | | | |
|---|---|---|---|
| 10,225,492 B1* | 3/2019 | Steffanson | G08B 21/0407 |
| 2013/0026365 A1* | 1/2013 | Jahnke | G01M 99/002 |
| | | | 250/338.1 |
| 2016/0021272 A1* | 1/2016 | Utsunomiya | G06K 15/406 |
| | | | 358/1.13 |
| 2017/0116484 A1* | 4/2017 | Johnson | A61B 5/145 |
| 2018/0061044 A1* | 3/2018 | Woodbridge | G06T 7/73 |

FOREIGN PATENT DOCUMENTS

| | | |
|---|---|---|
| CN | 103186902 | 7/2013 |
| CN | 107295230 | 10/2017 |

OTHER PUBLICATIONS

"Office Action of China Counterpart Application", dated May 26, 2021, p. 1-p. 11.

\* cited by examiner

MONITORING SYSTEM AND MONITORING METHOD THEREOF

CROSS-REFERENCE TO RELATED APPLICATION

This application claims the priority benefit of Taiwan application serial no. 108108135, filed on Mar. 12, 2019. The entirety of the above-mentioned patent application is hereby incorporated by reference herein and made a part of this specification.

BACKGROUND

Field of the Disclosure

The disclosure relates to a monitoring technology, and in particular to a monitoring system and a monitoring method thereof.

Description of Related Art

With the advancement of science and technology, various automation controls are gradually introduced into family life, such that smart homes becomes one of the topics of research and development of many manufacturers. Among them, indoor positioning and activity detection is the essential technology for building a smart living space. For example, providing illumination according to the location of the user, activating illumination in response to clapping by user's hand and the like. It should be noted that, even if high technology brings convenience to human beings, technology in domestic environment should still meet personal privacy requirements. In addition, technology should be integrated into the personal living space without changing the user's comfortable living environment. Under the above considerations, although the image resolution of commonly used cameras or monitors on the market is high, the care recipient is likely to have a negative feeling of being watched, and even suspects of infringing on personal privacy. On the other hand, although the user can deploy the pressure sensor on the ground of the monitoring environment, the larger the area, the higher the cost. It can be seen that it is difficult to balance privacy and cost in the related art.

SUMMARY

In view of this, the present disclosure provides a monitoring system and a monitoring method thereof, which can provide a critical monitoring function for a monitored person while maintaining personal privacy.

A monitoring method in the embodiment of the disclosure includes the following steps. A thermal imaging image is obtained. A separating distance between a reference thermal source and a target thermal source in the thermal imaging image is determined. The reference thermal source corresponds to a reference position, and the target thermal source corresponds to a target person. A current posture corresponding to the target thermal source in the thermal imaging image is determined. An alarm signal is transmitted according to the separating distance and the current posture. The alarm signal is related to notifying the condition of the target person.

On the other hand, a monitoring system according to an embodiment of the present disclosure includes a thermal imaging device and a processor. The thermal imaging device obtains a thermal imaging image. The processor is coupled to the thermal imaging device and configured to perform the following steps. A separating distance between a reference thermal source and a target thermal source in the thermal imaging image is determined. The reference thermal source corresponds to a reference position, and the target thermal source corresponds to a target person. A current posture corresponding to the target thermal source in the thermal imaging image is determined. An alarm signal is transmitted according to the separating distance and the current posture. The alarm signal is related to notifying the condition of the target person.

Based on the above, the monitoring system and the monitoring method thereof in the embodiments of the present disclosure use the thermal image tracking method to perform personal behavior recognition. Thermal imaging images only present the temperature distribution of human body, but the biological characteristics or detailed motion information cannot be clearly displayed, which enhances the privacy of the monitored person and is further adaptable for low light environments. In addition, the positioning detecting method and the movable mechanism proposed by the embodiments of the present disclosure enable the lens of the thermal imaging device to follow the monitored person at any time, thereby achieving immediate and continuous activity monitoring in the indoor environment.

In order to make the aforementioned features and advantages of the disclosure more comprehensible, embodiments accompanying figures are described in detail below.

DESCRIPTION OF EMBODIMENTS

Figure 1:
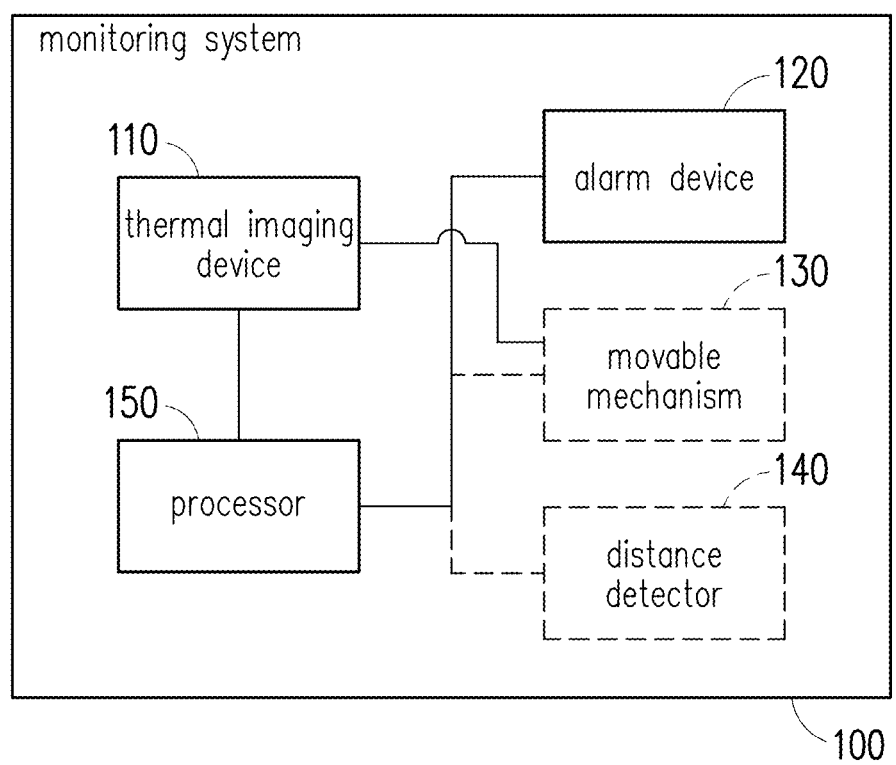
FIG. 1 is a block diagram showing components of a monitoring system according to an embodiment of the present disclosure.

FIG. 1 is a block diagram showing components of a monitoring system 100 according to an embodiment of the present disclosure. Referring to FIG. 1, the monitoring system 100 may include, but is not limited to, a thermal imaging device 110, an alarm device 120, and a processor 150.

The thermal imaging device 110 can be a thermal imager, an infrared thermal imager, an infrared camera, or other device that can perform sensing-image on the infrared light emitted by an object. The thermal imaging device 110 may include electronic components such as a photosensitive component that is sensitive to infrared rays, a lens, a focusing mechanism, and an image processor. In the present embodiment, the thermal imaging device 110 can generate and obtain thermal imaging images in response to infrared rays of external objects (e.g., humans, animals, lighting devices, etc.). The thermal imaging image is recorded with a temperature distribution.

The alarm device 120 can be a speaker, an alarm, or other device that can emit sound. The alarm device 120 can also be a Light-Emitting Diode (LED), various types of displays, or other devices that can display a visual image or light. The alarm device 120 is more likely to be a communication transceiver, a transmission interface or other device that can send and receive data, messages or information.

The processor 150 is coupled to the thermal imaging device 110 and the alarm device 120. The processor 150 can be a central processing unit (CPU) or other programmable general-purpose or specific-purpose microprocessor, a Digital Signal Processing (DSP), a Programmable Controller, Application-Specific Integrated Circuit (ASIC) or other similar components or a combination of the above. In the embodiment of the present disclosure, the processor 150 is configured to perform all operations of the monitoring system 100.

Depending on different requirement of design, in an embodiment, the monitoring system 100 further includes a movable mechanism 130. The movable mechanism 130 is coupled to the thermal imaging device 110 and directly or indirectly connected to the processor 150. The movable mechanism 130 may be various types of mechanical components or a combination thereof that can drive the connecting component to move or rotate such as a multi-axis robot arm, a multi-degree of freedom mechanism, a height adjustment table, a slide rail, a gear, a rotary table, a screw, a shaft member, a motor, or a cylinder to drive the thermal imaging device 110 to be lifted, be lowered, move, and/or rotate.

In another embodiment, the monitoring system 100 further includes a distance detector 140. The distance detector 140 can be an infrared detector, a radar, a depth camera, or another thermal imaging device 110. The detection result of the distance detector 140 can be used to determine the relative distance of external object.

It should be noted that, in an embodiment, the components and devices of the monitoring system 100 can be integrated into a single device. In other embodiments, the components and devices of the monitoring system 100 can also be separated and communicate with each other through wired or wireless communication technologies.

In order to facilitate the understanding of the operation flow of the embodiment of the present disclosure, the flow of use of the monitoring system 100 in the embodiment of the present disclosure will be described in detail below. Hereinafter, the methods described in the embodiments of the present disclosure will be described with reference to various devices, components, and modules in the monitoring system 100. The various processes of the method can be adjusted according to the implementation situation, and are not limited thereto.

Figure 2:
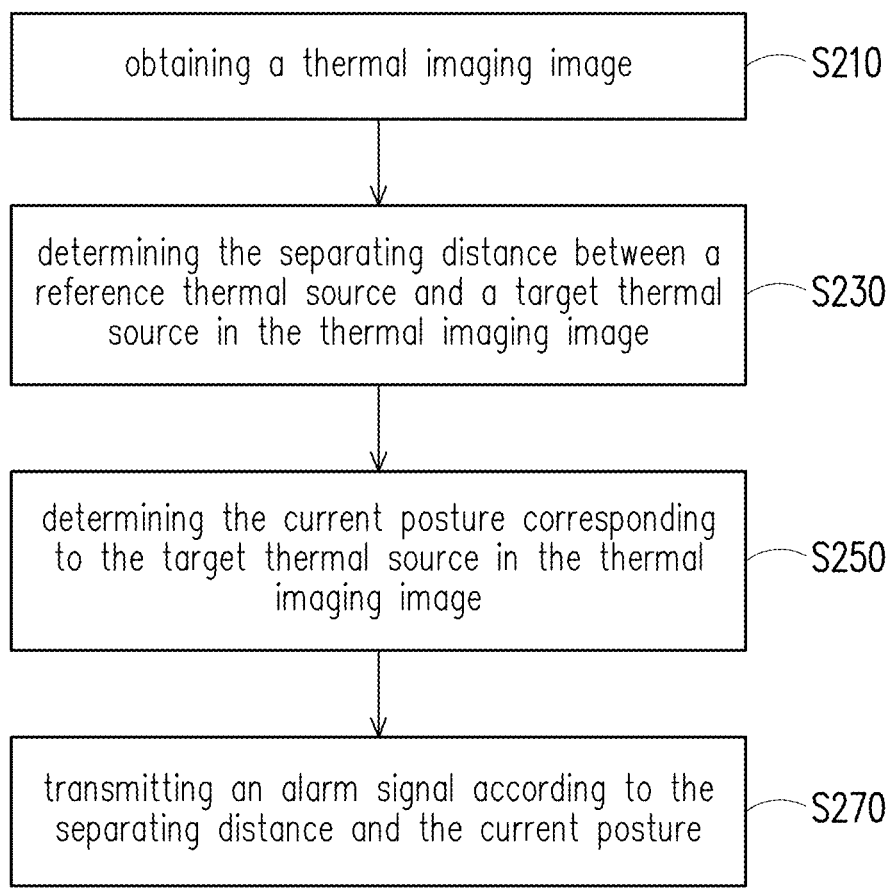
FIG. 2 is a flow chart of a monitoring method according to an embodiment of the present disclosure.

FIG. 2 is a flow chart of a monitoring method according to an embodiment of the present disclosure. Referring to FIG. 2, it is assumed that an application scenario is that the thermal imaging device 110 is installed in a specific environment (e.g., bedroom, ward, office, balcony, etc.), and the thermal imaging device 110 is activated to capture thermal imaging images. The processor 150 obtains the thermal imaging image through the thermal imaging device 110 (step S210). The thermal imaging image may be raw sensing information or converted into digital image form.

Figure 3:
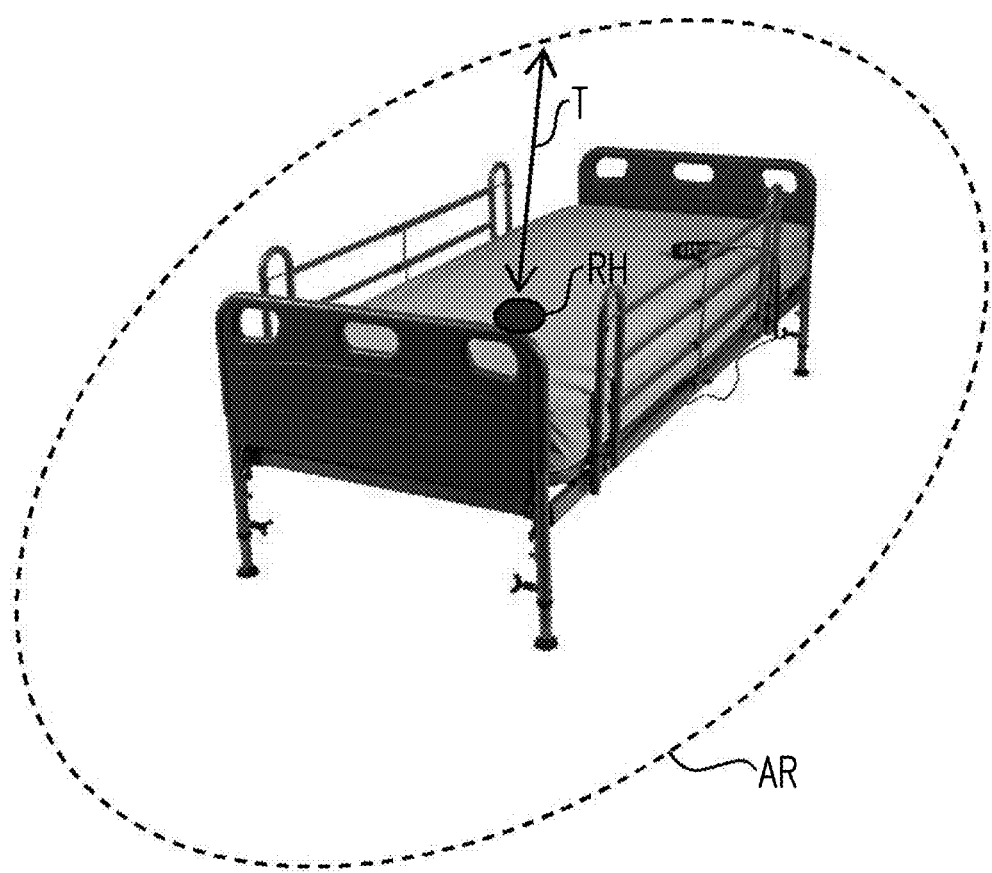
FIG. 3 is an example illustrating a reference thermal source.

The processor 150 determines the separating distance between a reference thermal source and a target thermal source in the thermal imaging image immediately or at specific times (e.g., 1, 3, 5 seconds, etc.)/number of images (e.g., 30, 60, 100 images, etc.) (step S230). Specifically, a reference thermal source (e.g., a bulb, a heater, etc.) is placed in the aforementioned environment. The reference thermal source corresponds to a reference position in the environment. Depending on the application scenario, the reference position may be located on a bed, sofa, table, chair, wall, etc. or on a specific ground. The reference thermal source and the reference position are used as reference for behavior recognition in the embodiment of the present disclosure, and the use method thereof will be described in detail later. For example, FIG. 3 is an example illustrating a reference thermal source RH. Referring to FIG. 3, the reference thermal source RH is placed on the hospital bed. That is to say, the reference position of this example is related to the location of the hospital bed in the environment. On the other hand, the target thermal source corresponds to the target person (or the monitored person).

Figure 4A:
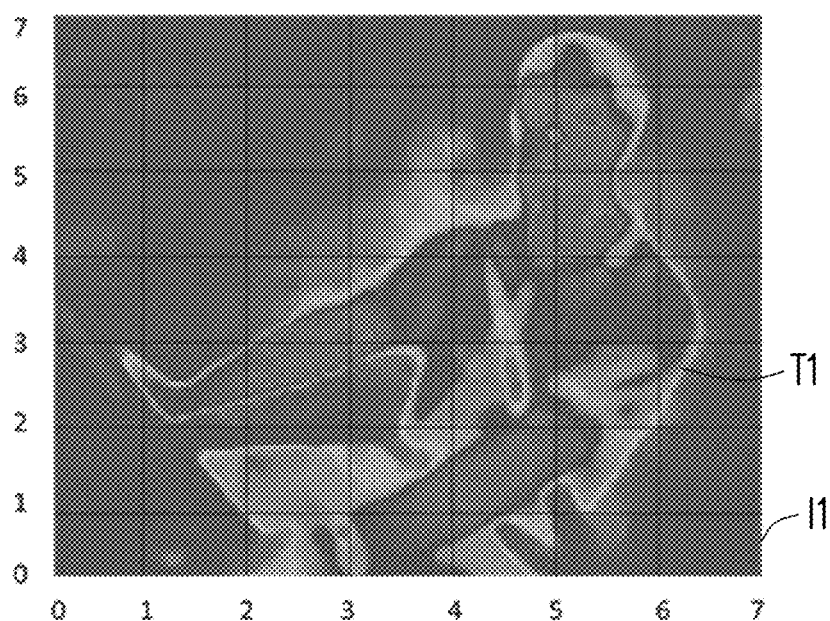
FIG. 4A and FIG. 4B are two examples illustrating thermal imaging images.
Figure 4B:
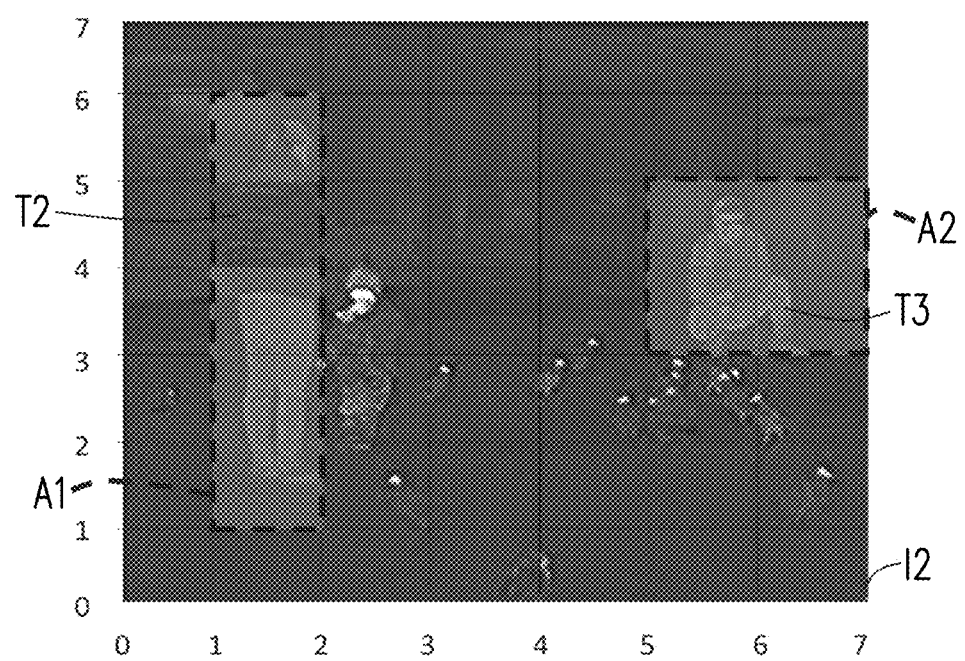

Both the reference thermal source and the target thermal source have certain temperatures, and the processor 150 can further identify the reference thermal source and/or the target thermal source in the thermal imaging image according to the identification rule. The identification rule is, for example, whether there is a temperature in a specific temperature range in the image, whether an outline shape formed by the specific temperature range conforms to a target person or a reference thermal source, and the like. FIG. 4A is an example illustrating a thermal imaging image I1. Referring to FIG. 4A, the outline of the target thermal source T1 in the thermal imaging image I1 can be determined as a human. FIG. 4B is another example describing a thermal imaging image I2. Referring to FIG. 4B, the area A1 occupied by the target thermal source T1 in the thermal imaging image I2 can be determined as a human.

After identifying the reference thermal source and the target thermal source, the processor 150 can further derive the approximate locations of the two thermal sources. In an embodiment, processor 150 directly determines the separating distance in the thermal imaging image. Taking FIG. 4A as an example, the processor 150 can divide the thermal imaging image I1 into a matrix with longitudinal lines and lateral lines (i.e., forming a plurality of four-sided grid blocks with the same size), and the processor 150 can further determine the number of four-sided grid blocks between the target thermal source T1 and the reference thermal source (not shown) in the thermal imaging image I1 to estimate the separating distance between the two thermal sources. Alternatively, the processor 150 may estimate the separating distance of the two thermal sources according to the amount of pixels between the two thermal sources in the thermal imaging image or according to a reference ratio (for example, the ratio of the image length to the actual length).

Figure 5B:
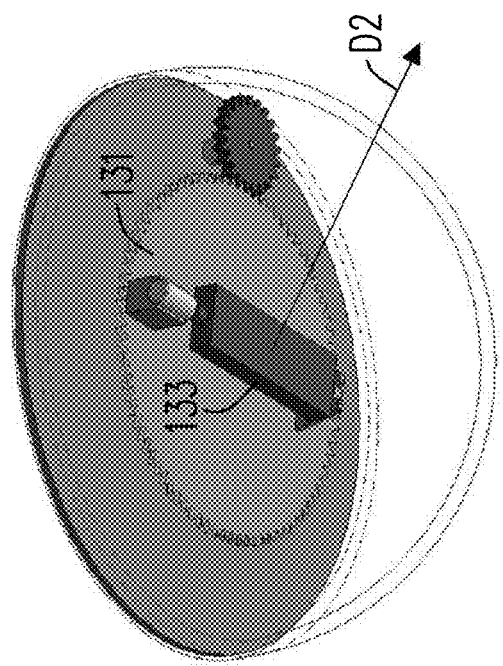
FIG. 5A and FIG. 5B illustrate horizontal rotation of a movable mechanism according to an embodiment of the present disclosure.
Figure 5A:
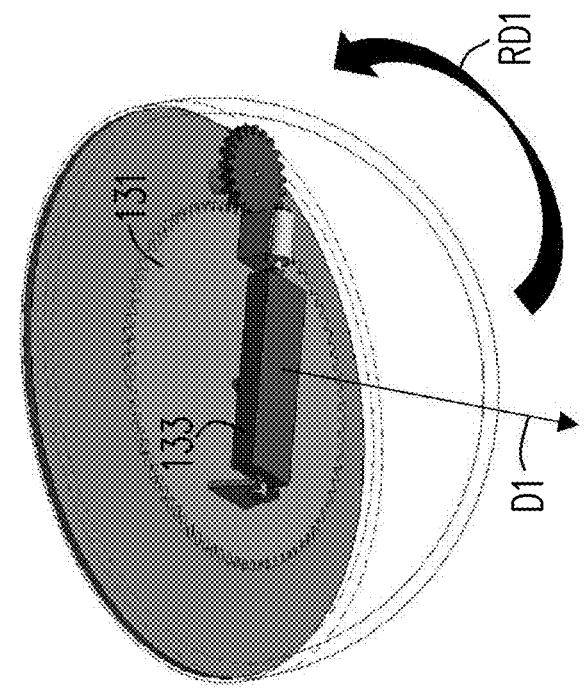

In another embodiment, the processor 150 may estimate the separating distance of the two thermal sources based on the movement of the movable mechanism 130. Specifically, first, the processor 150 can control the movable mechanism 130 to make a direction corresponding to the thermal imaging image be corresponded to the reference thermal source. FIG. 5A and FIG. 5B illustrate horizontal rotation of the movable mechanism 130 according to an embodiment of the present disclosure. Referring to FIG. 5A and FIG. 5B, the movable mechanism 130 includes a rotary table 131 and a motor (not shown). The rotary table 131 is indirectly connected to the thermal imaging device 110 (not shown, for example, disposed at a shaft member 133). The motor is coupled to the rotary table 131 and the processor 150. The processor 150 can drive the rotary table 131 to rotate horizontally through the motor, so that the thermal imaging device 110 is rotated horizontally. For example, after the rotary table 131 is horizontally rotated along the arrow RD1, the image capturing direction D1 (i.e., the direction corresponding to the thermal imaging image from the thermal imaging device 110 (probably extended along a vertical line from the image center)) shown in FIG. 5A is steered toward the image capturing direction D2 shown in FIG. 5B, thereby changing the direction corresponding to the thermal imaging image.

Figure 6B:
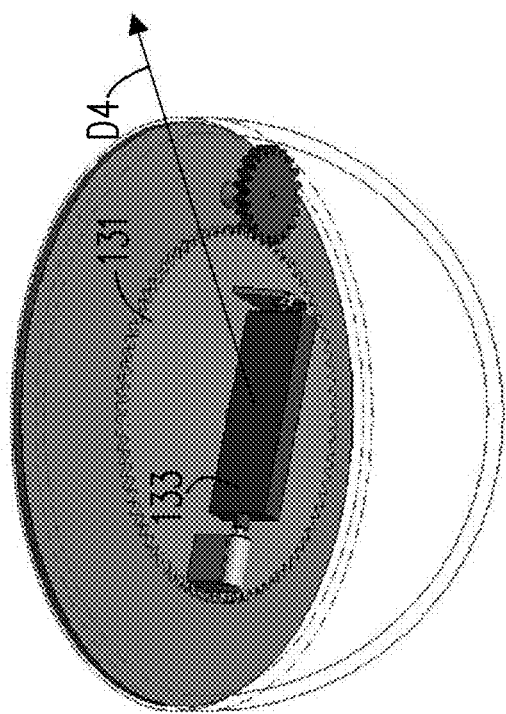
FIG. 6A and FIG. 6B illustrate vertical rotation of a movable mechanism according to an embodiment of the present disclosure.
Figure 6A:
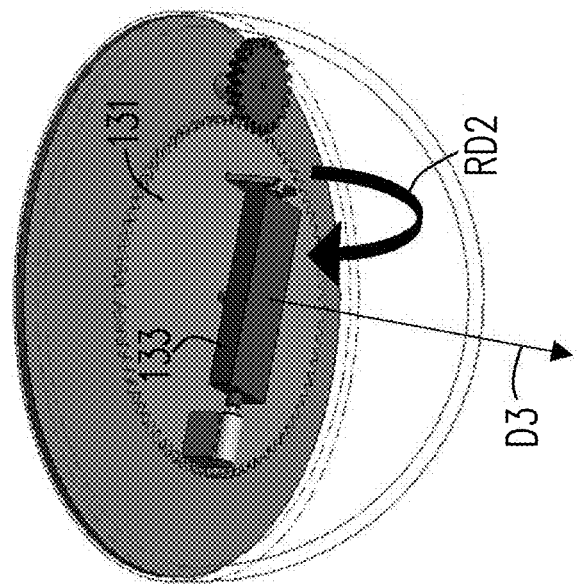

FIG. 6A and FIG. 6B illustrate vertical rotation of the movable mechanism 130 according to an embodiment of the present disclosure. Referring to FIG. 6A and FIG. 6B, the movable mechanism 130 includes a shaft member 133 and a motor (not shown). The shaft member 133 is connected to the thermal imaging device 110 (not shown, for example, disposed at the shaft member 133). The motor is coupled to the shaft member 133 and the processor 150. The processor 150 can drive the shaft member 133 to rotate through the motor, so that the thermal imaging device 110 is rotated vertically. For example, after the shaft member 133 is vertically rotated along the arrow RD2, the image capturing direction D3 shown in FIG. 6A is steered toward the image capturing direction D4 shown in FIG. 6B, thereby changing the direction corresponding to the thermal imaging image. With the structures shown in FIG. 5A, FIG. 5B, FIG. 6A and FIG. 6B, the need for hemispherical rotation can be achieved.

It should be noted that, the horizontal rotation is a rotation of the assumed X-Y axis, and the vertical rotation is a rotation of the assumed X-Z axis or the Y-Z axis. Further, the movable mechanism 130 is not limited to the structures and movement manners in FIG. 5A, FIG. 5B, FIG. 6A, and FIG. 6B. In other embodiments, the movable mechanism 130 may include other moving members as long as the mechanism design can change the image capturing direction of the thermal imaging device 110. For example, the movable mechanism 130 is a multi-axis robot arm, and thus the thermal imaging device 110 can flexibly face a specific image capturing direction.

Figure 7A:
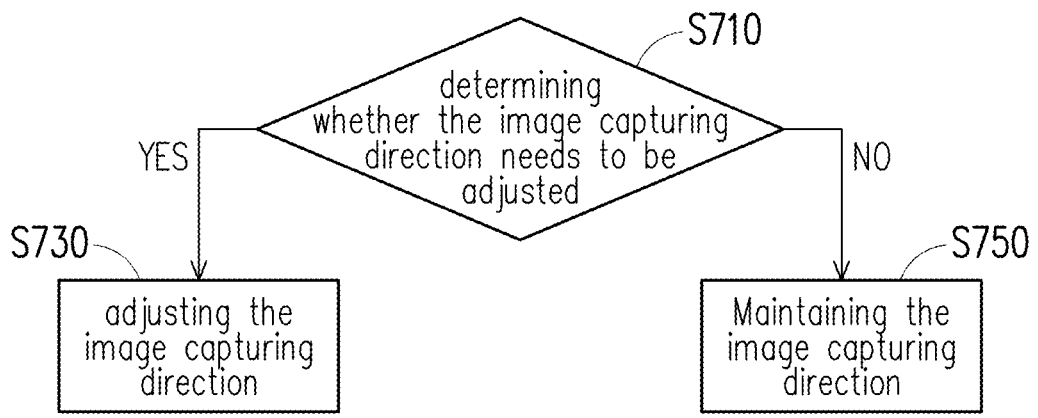
FIG. 7A is a flow chart showing adjusting an image capturing direction according to an embodiment of the disclosure.

In response to that, the image capturing direction substantially faces the reference thermal source (e.g., the reference thermal source is substantially located at the center of the thermal imaging image), the processor 150 can record the original direction currently corresponding to the movable mechanism 130. For example, the angular position of the gear relative to the rotary table 131 and/or the shaft member 133, the direction pointed from the outermost end of the robot arm, and the like. FIG. 7A is a flow chart showing adjusting an image capturing direction according to an embodiment of the disclosure. Referring to FIG. 7A, the processor 150 then determines whether the target thermal source exists in the thermal imaging image or whether the target thermal source is located in the image center, and determines whether the image capturing direction needs to be adjusted according to the determining result (step S710). For example, if there is no target thermal source in the image or the target thermal source is not located at the center of the screen, the image capturing direction needs to be adjusted (step S730). The processor 150 will control the movable mechanism 130 to change the image capturing direction of the thermal imaging device 110, such that the image capturing direction substantially faces toward the target thermal source, and the target thermal source is substantially located at the center of the thermal imaging image. On the other hand, for example, the target thermal source is already located at the center of the image, the processor 150 can control the image capturing direction of the thermal imaging device 110 to be maintained (step S750). In this manner, it is possible to achieve the user position tracking function, and solve the problem that the lens field of view some thermal imaging devices 110 may not able to cover the overall monitored environment.

Moreover, in response to that the imaging capturing direction substantially faces toward the target thermal source, the processor 150 can record the current direction corresponding to the movable mechanism 130. Next, the processor 150 determines the separating distance based on the difference between the original direction and the current direction. For example, if the difference between the two recorded angular positions of the gears is 15 degrees, then the separating distance is about 1 meter. Or, if the difference between the two recorded directions pointed by the robot arm is 30 degrees, then the separating distance is about 80 cm. It should be noted that the ratio of difference and the separating distance corresponding to different movable mechanisms 130 may be different and can be adjusted depending on the user's actual needs.

In addition, in order to improve the accuracy of determining the distance, the processor 150 may further determine the separating distance according to the detection result of the distance detector 140 corresponding to the target thermal source. Specifically, in some scenarios, the target thermal source may be located at the connecting line between the reference thermal source and the thermal imaging device. There might be an error if the separating distance is determined based on the temperature distribution condition of the thermal imaging image alone. The processor 150 can detect the relative distance away from the target person through the distance detector 140, and then estimate the separating distance between the target thermal source and the reference thermal source based on the distance between the reference thermal source and the thermal imaging device. For example, the distance detector 140 detects that a relative distance away from the target person is two meters, and the processor 150 has recorded that a distance away from the reference thermal source is three meters, then the separating distance is one meter.

In Addition, the distance detector 140 may also be another thermal imaging device 110. The distance detector 140 has a different image capturing direction as compared with the thermal imaging device 110. The processor 150 can derive two initially estimated relative distances based on the target thermal sources in the thermal imaging images captured by the two devices (i.e., the thermal imaging device 110 and the distance detector 140), and the processor 150 estimates the separating distance based on the two relative distances and through the triangulation method.

After the separating distance is obtained, the processor 150 determines whether the separating distance is greater than a threshold (for example, 50 cm, 1 meter, 2 meters, etc.). The threshold is related to being away from the reference position (i.e., away from the reference thermal source) or an alarm range. The notification condition corresponding to the subsequent alarm signal includes that the separating distance is greater than the threshold. In the embodiment of the present disclosure, the separating distance will serve as a reference for the alarm notification.

Taking FIG. 3 as an example, with the reference thermal source RH as the center and extending outward according to a specific radius T, an alarm range AR (for example, a bed range) is formed. The specific radius T can be used as the threshold. In other embodiments, the reference thermal source RH may also be placed at the center of the long side, short side of the bed or at any other location, and the processor 150 uses the geometric relationship (e.g., the distance relative to the bed head, the direction relative to the short side, a quadrilateral formed by four sides, etc.) to set the bed range to the alarm range. The processor 150 may ignore, make no judgment, not notify, or set no notification condition for the current posture of the target person within the alarm range AR. For example, the alarm range AR is edge of a hospital bed, and the posture of standing or walking on the hospital bed can be regarded as abnormality, and notification for this situation should be reported. On the other hand, the processor 150 can judge or report for the current posture of the target person outside the alarm range AR. In other words, a specific posture outside the edge of the hospital bed is the basis for reporting.

In other embodiments, for example, in an office scene, with the reference thermal source RH as the center and edge of the sofa or the chair as the alarm range AR, the sitting or lying posture of the target person outside the alarm range AR will be regarded as a condition for reporting.

It should be noted that, the shape and/or size of the alarm range AR and the magnitude of the threshold may be adjusted according to actual needs and are not limited to a single value, and the method of setting the alarm range is not limited to the above description.

On the other hand, the processor 150 can determine the current posture corresponding to the target thermal source in the thermal imaging image (step S250). For example, the processor 150 determines the current posture of the target person based on the area or outline corresponding to the target thermal source in the thermal imaging image. For the area identification, take FIG. 4B as an example, the area A1 corresponding to the target thermal source T2 is 5*1 grid blocks, indicating that the height (for example, length of 5 grid blocks is approximately 180 cm) corresponding to the area A1 exceeds a certain height (for example, 140, 150 cm and so on), and the processor 150 determines that the current posture of the target thermal source T2 is standing posture. The area A2 corresponding to the target thermal source T3 is 2*2 grid blocks, indicating that the height (for example, length of 2 grid blocks is approximately 70 cm) corresponding to the area A2 is lower than a specific height (for example, 100, 110 cm, etc.), and the processor 150 determines that the current posture of the target thermal source T3 is squatting posture. If the number of grid blocks corresponding to the target thermal source, which is parallel to the horizontal line, is 5, the processor 150 can determine that the current posture is lying posture. For outline identification, the processor 150 can perform identification operations by means of database comparison, image identification, artificial neural network (ANN) inference and so on.

In this embodiment, the processor 150 further determines whether the current posture does not conform to the preset posture. The preset gesture is related to standing, sitting, lying or walking posture. The notification condition corresponding to the subsequent alarm signal includes that the current posture does not conform to the preset posture. In other words, the preset posture is also used as a reference for alarming notification.

In an embodiment, the processor 150 determines whether the area corresponding to the target thermal source in the thermal imaging image does not conform to the area corresponding to the preset posture. Take FIG. 4B as an example, the preset area for standing is 5*1 grid blocks. If the area corresponding to the current posture is less than 5*1 grid blocks and shape thereof is not a long bar shape, the processor 150 determines that the area does not conform to the preset posture.

In another embodiment, the processor 150 determines whether the outline corresponding to the target thermal source in the thermal imaging image does not conform to the outline corresponding to the preset posture. Take FIG. 4B as an example, the current posture of the target thermal source T2 is the standing posture. The processor 150 can record the outline features (e.g., curvature, length, etc.) of standing and walking posture in advance, and determine whether the current outline does not conform to the outline corresponding to the preset posture through the image identification technology.

It should be noted that, in other embodiments, the processor 150 can also directly determine whether the current posture conforms to the alarm posture (e.g., lying down, squatting, etc.), and the notification condition corresponding to the subsequent alarm signal is that the current posture conforms to the alarm posture.

Next, the processor 150 transmits an alarm signal according to the separating distance and the current posture (step S270). In the present embodiment, the processor 150 transmits an alarm signal in response to that the separating distance is greater than the threshold (based on the determining result of step S230) and the current posture does not conform to the preset posture (based on the determining result of step S250). The alarm signal is related to notifying the situation of the target thermal source corresponding to the target person. The alarm signal can be further transmitted to the alarm device 120, and the alarm device 120 will make a sound, present a visual illumination or a picture, or report to the outside world based on the alarm signal. On the other hand, in response to that the current posture conforms to the preset posture or the separating distance is not greater than the threshold, the processor 150 continues to monitor through the thermal imaging device 110.

It should be noted that, regarding the timing of transmitting the alarm signal, in an embodiment, the processor 150 may immediately transmit an alarm signal as long as it is determined that the separating distance and the current posture conform to the notification condition. In another embodiment, the processor 150 may first determine the continuing duration during which the separating distance and current gesture conforms to the notification condition. For example, a timer would be started for the continuing duration of conforming to the notification condition. The processor 150 will only transmit an alarm signal in response to that the continuing duration is longer than the alarm time (for example, 30 seconds, or 1 minute, etc.).

In this way, monitoring the person through the thermal imaging image will not record the detailed biological characteristics or detailed actions of the person, thereby reducing the privacy violation of the monitored person. In addition, the embodiment of the present disclosure can accurately determine whether the behavior of the monitored person needs to be reported through the judgment mechanism of the distance and the posture.

Figure 7B:
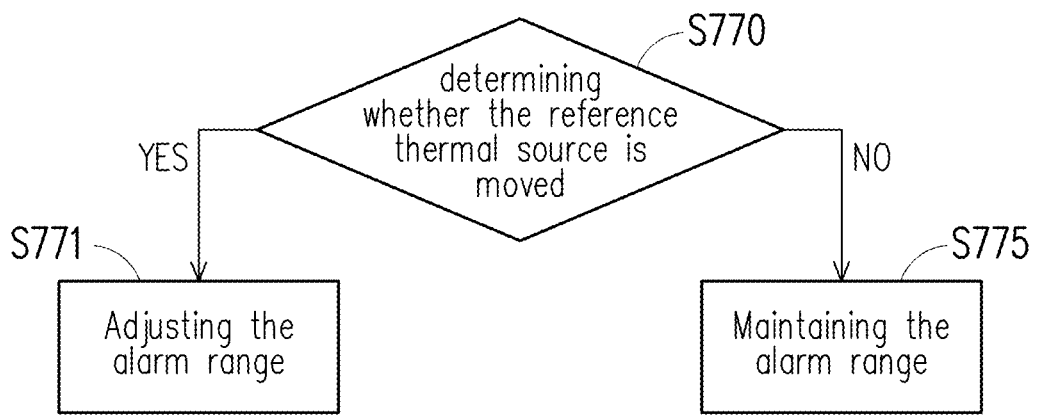
FIG. 7B is a flow chart showing adjusting alarm range according to an embodiment of the present disclosure.

It should be noted that in some scenarios, the position of the reference thermal source may move with changes or movements of the object or environment at which the reference thermal source is disposed. For example, the hospital bed in FIG. 3 is moved and thus the reference thermal source RH is moving. Therefore, the original alarm range will not be applicable to subsequent evaluation operations. In order to adapt to the situation that causes movement of the thermal source, FIG. 7B is a flow chart showing adjusting alarm range according to an embodiment of the present disclosure. Referring to FIG. 7B, the processor 150 determines whether the reference thermal source in the thermal imaging image is moved (step S770). The processor 150 records the original position of the reference thermal source (e.g., the location in the thermal imaging image, or the original direction currently corresponding to the movable mechanism 130, etc.), and determines whether the current location of the reference thermal source is different from the original position or whether the difference exceeds a specific distance threshold. In response to that the current location of the reference thermal source is different or the difference exceeds a specific distance threshold (i.e., the reference thermal source is moved), the processor 150 changes the alarm range according to the current position of the reference thermal source (step S771). That is, the alarm range is re-determined or updated. For example, the current position of the reference thermal source is set as the center and the alarm range is formed by a specific radius as a new alarm range. On the other hand, in response to that the current position of the reference thermal source is the same or the difference does not exceed the specific distance threshold (i.e., the reference thermal source has not moved), the processor 150 maintains the alarm range (step S775). In this manner, when, for example, the hospital bed shown in FIG. 3 is moved, the alarm range can also be updated, thereby avoiding misjudgment.

In addition, the foregoing embodiment only refers to a single monitored person, but in other embodiments, the embodiment of the present disclosure can also be applied to multi-person monitoring. For example, the processor 150 may record the original heights (e.g., when standing, or walking posture) or outlines of multiple target thermal sources to differentiate different target thermal sources. Then, applying the foregoing step flow in FIG. 2, the function of multi-person monitoring can also be achieved.

In order to facilitate the reader to better understand the implementation of the embodiments of the present disclosure, an application scenario will be described in details below. The parameters, environment and sequence in the application scenario can be adjusted according to actual needs.

Figure 8:
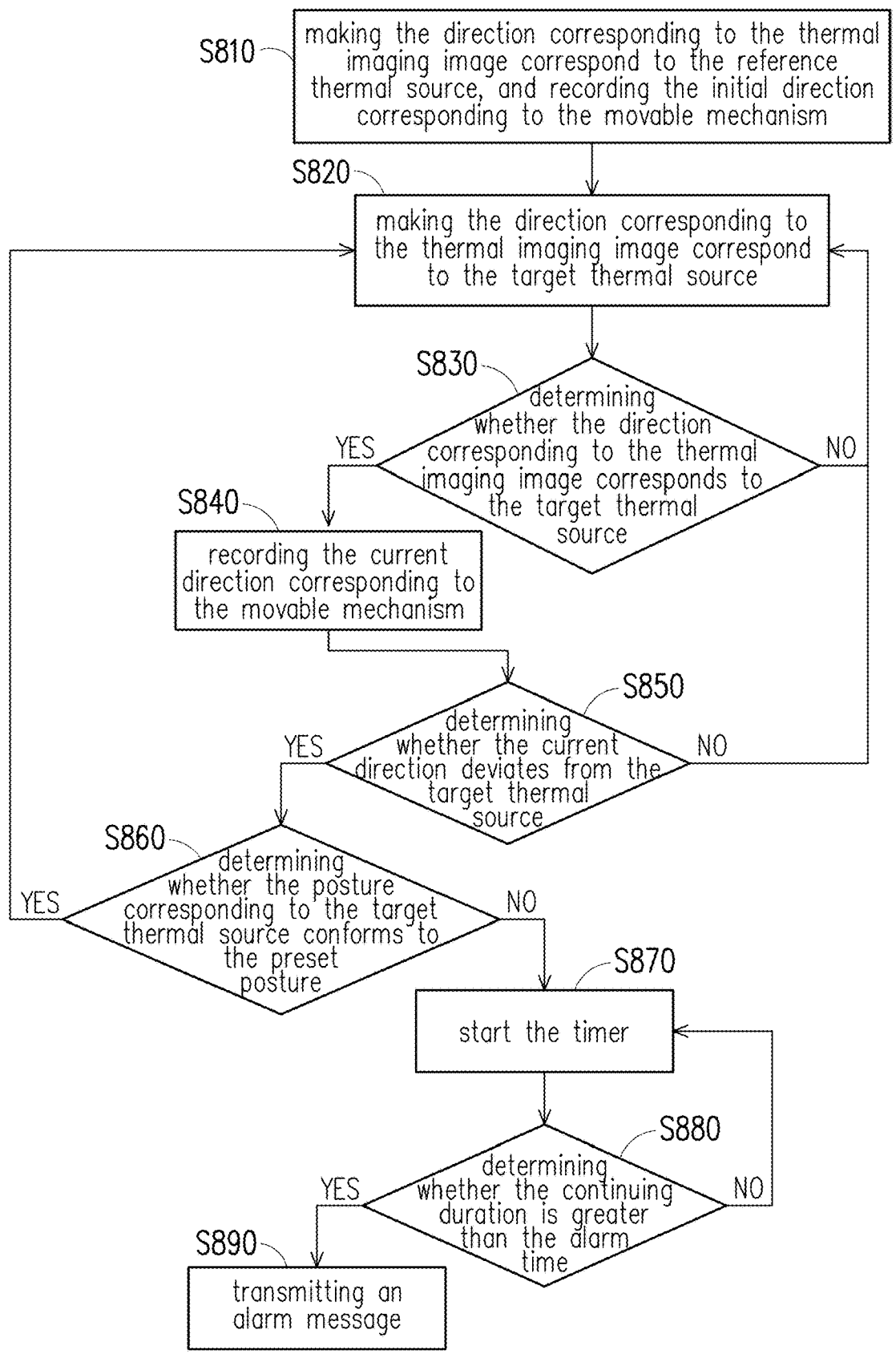
FIG. 8 is a flow chart showing a monitoring method applied to a ward according to an embodiment of the present disclosure.

FIG. 8 is a flow chart showing a monitoring method applied to a ward according to an embodiment of the present disclosure. Referring to FIG. 3 and FIG. 8, it is assumed that the reference thermal source RH is provided on the hospital bed of FIG. 3, and the processor 150 first controls the movable mechanism 130 to make the direction (i.e., the image capturing direction of the thermal imaging device 110) corresponding to the thermal imaging image correspond to the reference thermal source RH (for example, at the center of the image), and records the original direction corresponding to the movable mechanism 130 (step S810). For example, the angular position of the gear in the movable mechanism 130 is recorded as a start point (i.e., corresponding to the original direction). In an embodiment, if multiple thermal imaging devices 110 are provided (respectively corresponding to different image capturing directions to cover the monitoring range), the movable mechanism 130 can be omitted. (i.e., the thermal imaging device 110 may be disposed without a mechanism for rotation.)

The processor 150 then controls the movable mechanism 130 to make the direction corresponding to the thermal imaging image correspond to the target thermal source (step S820), and confirms whether the direction corresponding to the thermal imaging image corresponds to the target thermal source (step S830). If the image capturing direction has not yet corresponded to the target thermal source, the processor 150 continues to control the movable mechanism 130. If the image capturing direction has corresponded to the target thermal source, the processor 150 records the current direction corresponding to the movable mechanism 130 (step S840). For example, the angular position of the gear in the movable mechanism 130 is recorded and used as a deviation point (i.e., corresponding to the current direction).

The processor 150 may determine whether the current direction is deviated from the target thermal source based on the original direction and the current direction (step S850), for example, whether the difference between the original direction and the current direction is less than 30 degrees. If the current direction is not deviated from the target thermal source, the processor 150 continuously controls the image capturing direction to correspond to the target thermal source. If the current direction is deviated from the target thermal source (for example, the difference is greater than 30 degrees, representing leaving the alarm range AR), the processor 150 determines whether the posture corresponding to the target thermal source conforms to the preset posture (step S860). Take FIG. 4B as an example, the preset posture is a standing posture. The posture of the target thermal source T2 conforms to the preset posture, and the posture of the target thermal source T3 does not conform to the preset posture. If the current posture conforms to the preset posture, the processor 150 continuously controls the image capturing direction to correspond to the target thermal source. If the current gesture does not conform to the preset gesture, the processor 150 will start timing (step S870) to accumulate the continuing duration.

The processor 150 determines whether the continuing duration is greater than the alarm time (for example, one minute) (step S880). If the continuing duration is not greater than the alarm time, the processor 150 continues the time for the continuing duration and interrupts the timer as long as the separating distance and the current posture do not conform to the notification condition. If the continuing duration is longer than the alarm time, the processor 150 transmits an alarm message (step S890), and notifies the administrator through the alarm device 120.

In summary, the monitoring system and the monitoring method thereof in the embodiments of the present disclosure use the thermal image tracking method to perform monitoring, which enhances protection of the monitored person's privacy and is more suitable for environments with low light source. In addition, the embodiment of the present disclosure can confirm whether the monitored person needs to be reported through the separating distance and current posture, thereby improving the accuracy of the judgment. Combined with the movable mechanism, the embodiments of the present disclosure can further continuously follow the monitored person. Compared with the construction of a large number of pressure sensors, the embodiments of the present disclosure are more likely to save the construction cost of the monitoring device.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A monitoring method, comprising:
obtaining a thermal imaging image;
determining a separating distance between a reference thermal source and a target thermal source in the thermal imaging image, comprising:
providing a movable mechanism to adjust to a direction corresponding to the thermal imaging image;
controlling the movable mechanism to make the direction be corresponded to the reference thermal source, and recording an original direction corresponding to the movable mechanism, wherein the reference thermal source corresponds to a reference position, and the target thermal source corresponds to a target person;
controlling the movable mechanism to make the direction be corresponded to the target thermal source, and recording a current direction corresponding to the movable mechanism; and
determining the separating distance based on the original direction and the current direction;
determining whether the separating distance between the reference thermal source and the target thermal source is greater than a threshold;
determining a current posture corresponding to the target thermal source in the thermal imaging image, comprising:
determining whether the current posture does not conform to a preset posture; and
transmitting an alarm signal in response to the separating distance being larger than the threshold and the current posture not conforming to the preset posture, wherein the alarm signal is related to notifying a situation of the target person.

2. The monitoring method according to claim 1, wherein the preset posture is related to standing, sitting, lying or walking.

3. The monitoring method according to claim 2, wherein the step of determining whether the gesture conforms to the preset posture comprises:
determining whether an area or an outline corresponding to the target thermal source in the thermal imaging image does not conform to an area or an outline corresponding to the preset posture.

4. The monitoring method according to claim 1, wherein the threshold is related to being away from the reference position or an alarm range.

5. The monitoring method according to claim 4, wherein the step of obtaining the thermal imaging image is further followed by:
changing the alarm range according to a current position of the reference thermal source in response to movement of the reference thermal source in the thermal imaging image.

6. The monitoring method according to claim 1, wherein the step of determining the separating distance between the reference thermal source and the target thermal source in the thermal imaging image comprises:
determining the separating distance in the thermal imaging image.

7. The monitoring method according to claim 1, wherein the step of determining the separating distance between the reference thermal source and the target thermal source in the thermal imaging image comprises:
providing a distance detector; and
determining the separating distance according to a detection result of the distance detector corresponding to the target thermal source.

8. The monitoring method according to claim 1, wherein the step of transmitting the alarm signal according to the separating distance and the current posture comprises:
determining a continuing duration during which the separating distance and the current posture conform to a notification condition; and
transmitting the alarm signal in response to that the continuing duration is greater than an alarm time.

9. A monitoring system, comprising:
a thermal imaging device, obtaining a thermal imaging image;
a movable mechanism, coupled to the thermal imaging device; and
a processor, coupled to the thermal imaging device and the movable mechanism, and configured to perform:
determining a separating distance between a reference thermal source and a target thermal source in the thermal imaging image, comprising:
controlling the movable mechanism to make a direction corresponding to the thermal imaging image be corresponded to the reference thermal source, and recording an original direction corresponding to the movable mechanism, wherein the reference thermal source corresponds to a reference position, and the target thermal source corresponds to a target person;
controlling the movable mechanism to make the direction be corresponded to the target thermal source, and recording a current direction corresponding to the movable mechanism; and
determining the separating distance based on the original direction and the current direction;
determining whether the separating distance between the reference thermal source and the target thermal source is greater than a threshold;
determining a current posture corresponding to the target thermal source in the thermal imaging image, comprising:
determining whether the current posture does not conform to a preset posture;
transmitting an alarm signal in response to the separating distance being larger than the threshold and the current posture not conforming to the preset posture, wherein the alarm signal is related to notifying a situation of the target person; and
updating an alarm range formed by the threshold in response to a movement of the reference thermal source.

10. The monitoring system according to claim 9, wherein the preset posture is related to standing, sitting, lying or walking.

11. The monitoring system according to claim 10, wherein the processor is configured to perform:
determining whether an area or an outline corresponding to the target thermal source in the thermal imaging image does not conform to an area or an outline corresponding to the preset posture.

12. The monitoring system according to claim 9, wherein the threshold is related to being away from the reference position or the alarm range.

13. The monitoring system according to claim 12, wherein the processor is configured to perform:

changing the alarm range according to a current position of the reference thermal source in response to the movement of the reference thermal source in the thermal imaging image.

14. The monitoring system according to claim 9, wherein the movable mechanism comprises:
   a rotary table, connected the thermal imaging device; and
   a motor, coupled to the rotary table and the processor, wherein the processor drives the rotary table through the motor to rotate the thermal imaging device horizontally.

15. The monitoring system according to claim 9, wherein the movable mechanism comprises:
   a shaft member, connected to the thermal imaging device; and
   a motor, coupled to the shaft member and the processor, wherein the processor drives the shaft member through the motor to rotate the thermal imaging device vertically.

16. The monitoring system according to claim 9, wherein the processor is configured to perform:
   determining the separating distance in the thermal imaging image.

17. The monitoring system according to claim 9, further comprising:
   a distance detector, coupled to the processor, wherein the processor is configured to perform:
      determining the separating distance according to a detection result of the distance detector corresponding to the target thermal source.

18. The monitoring system according to claim 9, wherein the processor is configured to perform:
   determining a continuing duration during which the separating distance and the current posture conform to a notification condition; and
   transmitting an alarm signal in response to that the continuing duration is greater than an alarm time.

* * * * *